UNITED STATES PATENT OFFICE.

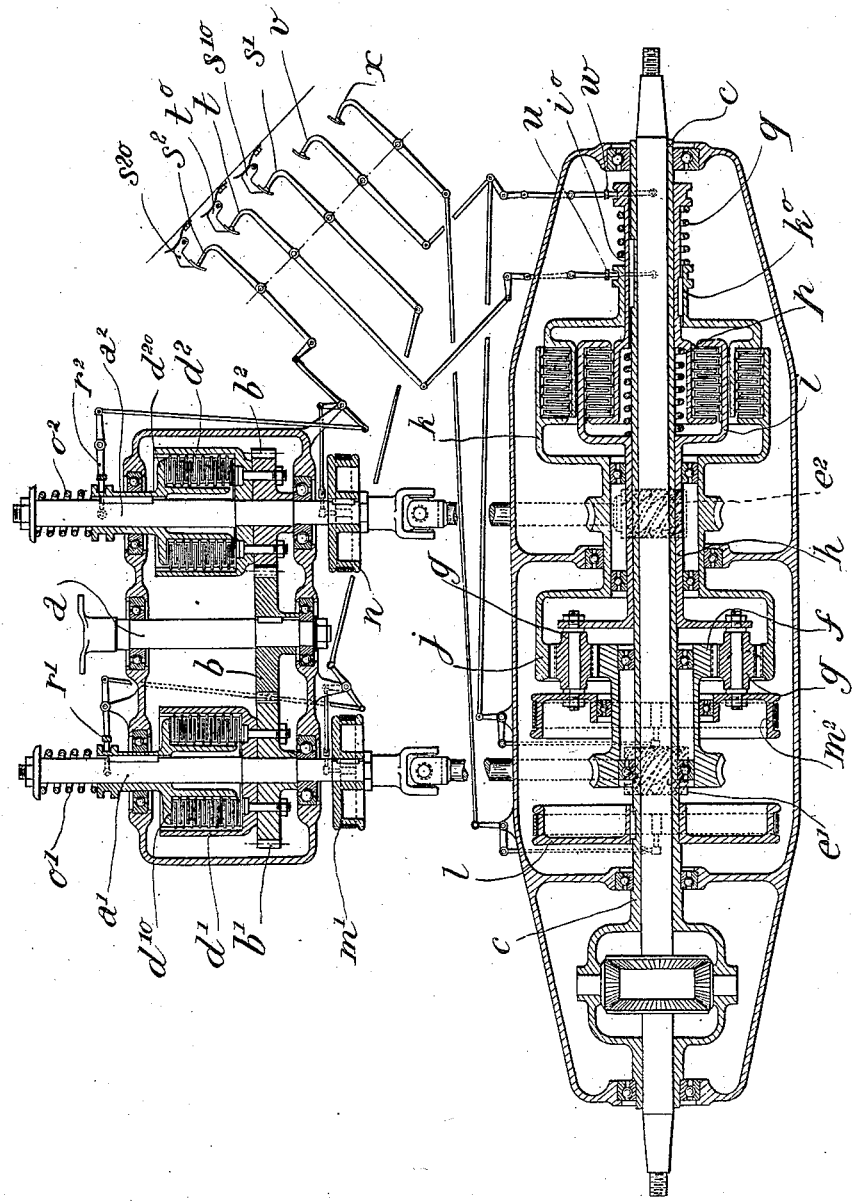

EMILE DESMOULINS, OF PARIS, FRANCE.

CHANGE-SPEED MECHANISM.

1,407,643.  Specification of Letters Patent.  Patented Feb. 21, 1922.

Application filed June 8, 1920. Serial No. 387,402.

*To all whom it may concern:*

Be it known that I, EMILE DESMOULINS, a citizen of the French Republic, residing at Paris, France, have invented certain new and useful Improvements in or Relating to Change-Speed Mechanism, as set forth in the following specification.

This invention relates to differential change speed mechanism of the kind comprising a series of planet pinions interposed between two principal pinions or gear wheels and meshing with these latter, means being added for enabling the gears to be disengaged, at will, so that they can be displaced with respect to one another, or for locking them together.

The present mechanism is particularly suitable for use with vehicles, whether terrestial, aquatic, or aerial, of the automobile type, although its use is not limited to this application.

The principal object of the invention is to construct change speed mechanism of the class in question in such a way that it is possible to obtain with the use of a number of parts equal to or but slightly more numerous than the parts or gear wheels generally employed in such apparatus, a considerable increase in the number of changes of speed which can be obtained.

According to the general principle of my invention I provide in place of the usual single primary shaft for operating mechanism of the class in question, two separate primary shafts, and I combine therewith mechanism or gearing so constructed and arranged that the two shafts can be connected respectively to one or other of the two principal pinions, in such a way that the device can be operated, at will, either from one or other of the said shafts, or again by the two at the same time. The planet pinion carrier is moreover connected to the driven shaft, which it is required to drive at various speeds, and the parts by which the change of speed is effected are so proportioned and arranged that the transformation may be effected simply by passing from operation by one of the primary shafts (taking the place of the ordinary single operating shaft) to operation by the second of these shafts.

The invention further refers to certain constructional details or arrangements, which are preferably employed in combination, and which will be more fully described hereafter.

Amongst these details, the most important are the following:—

A construction in which the two principal pinions are of different diameters so that a change of speed can be obtained simply by effecting the operation from one of these pinions instead of from the other.

A construction is shown, which is especially suitable for use upon automobile vehicles and wherein, in order to enable the various parts of the mechanism to be rendered free or connected together at will, clutches of the plate or disc type, substantially similar to those in general use are employed.

In order that the said invention may be more clearly understood, I will now proceed to describe the same with reference to the accompanying drawing, which however is given merely by way of example.

The drawing shows diagrammatically, the rear portion of an automobile fitted with a change speed mechanism and the two countershafts connected therewith, constructed and arranged according to the said invention. The rear portion and the associated mechanism are shown in horizontal axial section, whilst the controlling pedals for the gears and associated mechanisms are shown in the plane of section.

The change speed mechanism for the automobile vehicle illustrated in the drawing is constructed substantially as follows and in a manner enabling two distinct shafts to be employed for transmitting the force developed by the motor, the drive being ultimately obtained from either of the two shafts or from both of them.

Referring to the drawing $a$ is the principal shaft, adapted to be driven from the motor.

$a^1$ $a^2$ are two shafts to be driven, located one on each side of the shaft $a$, and preferably at unequal distances therefrom.

$b$ is a pinion keyed to the principal shaft.

$b^1$ $b^2$ are corresponding pinions loosely mounted respectively upon the shafts $a^1$ and $a^2$.

Corresponding clutches are also provided having fixed plates or portions $d^1$ and $d^2$ in rigid connection respectively with the pinions $b^1$ and $b^2$ whilst $d^{10}$ and $d^{20}$ are the corresponding movable portions of the said clutches mounted slidably, with keys or the like respectively upon the shafts $a^1$ $a^2$.

The change speed mechanism proper comprises a long driven sleeve $c$ and a differential change speed mechanism of the following construction:—

$f$ is a sun wheel with straight cut teeth, mounted loosely on the driven sleeve $c$ and rigidly connected by its sun wheel sleeve with a worm wheel, in mesh with a corresponding worm $e^1$, this latter and the worm wheel constituting a reversible helicoidal train connected preferably by a Cardan shaft to the countershaft $a^1$.

$g$ are corresponding planet pinions, the axles of which are so mounted on a carrier that the planet pinions mesh with the sun wheel $f$. $m^2$ is a brake pulley mounted loosely on the sleeve carrying the sun wheel $f$, and planet pinion carrier is connected at one side of the planet pinion carrier to the brake pulley $m^2$ and at the other side to a flange provided for the purpose upon a planet sleeve $h$ which sleeve is mounted loosely on the driven sleeve $c$. The said planet sleeve $h$ is moreover connected to the axially fixed outer portion $i$ of a planet clutch, preferably of the plate or disc type which serves to clutch the planet carrier to the driven shaft $c$.

$i^0$ is another sleeve slidable, with a key on the sleeve $c$, and forming the movable portion of the planet clutch corresponding to the fixed portion $i$. $j$ is an internally toothed annulus, so constructed and mounted that it meshes with the planet pinions $g$, this annulus $j$ is fixed to an annulus sleeve surrounding the planet sleeve.

Carried by the annulus sleeve is a worm wheel meshing with a worm $e^2$, the whole arrangement forming a reversible coupling, and the worm being connected, preferably by a Cardan shaft to countershaft $a^2$.

$k$ is an extension of the annulus sleeve, so constructed and arranged with respect to the previously mentioned planet clutch $i$ $i^0$ that it comes on the outside thereof and carries the axially fixed portion of another or supplementary annulus clutch.

$k^0$ is another sleeve longitudinally movable with the use of a key on the sleeve $i^0$ and carrying the movable portion of the annulus clutch last mentioned which is adapted to clutch the annulus $j$ to the driven sleeve $c$.

$l$ is a brake pulley for braking the driven sleeve $c$ and located on the latter.

$m^1$ is another brake pulley for braking the sun wheel $f$ and located for this purpose on the countershaft $a^1$.

$n$ is another brake pulley for braking the internally toothed annulus $j$ and located on the countershaft $a^2$.

$o^1$ and $o^2$ are two springs so arranged respectively with regard to the movable portion $d^{10}$ of the clutch $d^1$, $d^{10}$ and with regard to the movable portion $d^{20}$ of the clutch $d^2$, $d^{20}$ that they tend to keep these movable portions in the operative position.

$p$ is a spring interposed between a fixed member and the movable portion $i^0$ of the clutch $i$, $i^0$ so that it tends to keep the movable part in the operative position.

$q$ is another spring interposed between shoulders or the like formed for the purpose on the movable member $i^0$ and $k^0$ of the planet and annulus clutches $i$, $i^0$ and $k$ $k^0$ so that it tends to keep the second of the aforesaid movable members in the operative position.

$r^1$ and $r^2$ are forks, so arranged respectively with regard to the movable part $d^{10}$ of the clutch $d^1$, $d^{10}$ and to the movable part $d^{20}$ of the clutch $d^2$ $d^{20}$ that they permit these movable parts to be operated.

The operation is effected from pedals $s^1$ and $s^2$ which are so connected respectively to the fork $r^1$ and the band of the brake pulley $m^1$ and to the fork $r^2$ and the band of the brake pulley $n$, that by pressing progressively one or other of the pedals it is possible first of all to bring the corresponding moving part into the inoperative position and then without modifying this effect to bring the corresponding brake band into action.

$t$ is an annulus clutch pedal preferably located, as shown, between the two last mentioned pedals, so that it can be operated at the same time as one of them by the same foot. This pedal is so connected to a controlling fork $u$ co-operating with the moving part $k^0$, of the annulus clutch $k$, $k^0$ that on depressing this pedal, the said part can be rendered inoperative.

$v$ is a planet clutch pedal connected to the fork $w$, co-operating with the moving part $i^0$ of the clutch $i$ $i^0$ and also connected to the band of the brake pulley $m^2$ so that it is possible on depressing this pedal progressively, first to render the moving part inoperative and then without modifying this effect to render the band inoperative.

$x$ is another pedal, so connected to the brake band of the pulley $l$, that upon depressing this pedal the band comes into operation.

$s^{10}$ $s^{20}$ and $t^0$ are pawls in connection with the pedals $s^1$ $s^2$ and $t$, so arranged that when these pedals are sufficiently depressed for the movable parts of the clutches they control to be rendered inoperative, they keep these movable parts in their position. Each of the said pawls is however so arranged that it can be put out of action by the foot which operates the corresponding pedal.

The whole construction and arrangement just described enables the following results, amongst others to be obtained:—

*1. For starting the motor.*—Engage the pedals $s^1$, $s^2$ and the annulus clutch pedal $t$ with the pawls and start the motor, which then turns free, in the normal direction which direction will be hereinafter termed the positive direction for the sake of simplicity.

2. *First speed.*—Unclutch the pedals $s^1$. This causes the motor to drive sun wheel $f$ through the parts $a$, $b$, $b^1$, $d^2$, $d^{10}$, $a^1$ and $e^1$, and causes the annulus $j$ to turn in the negative direction. This is due to the resistance offered by the driven sleeve $c$ to the rotation of the whole device carrying the planet pinions $g$ and the resulting locking of the axles of the pinions. The internally toothed annulus $j$ and the parts controlled thereby, viz: the worm $e^2$ and the counter-shaft $a^2$ are correspondingly driven in the negative direction. Then fully depress the pedal $s^2$ which will lock the pulley $n$, thus preventing the just described rotation in the negative direction and consequently compelling the planet pinions $g$ to operate upon the annulus $j$ and, in turning the planet pinion carrier, to overcome the resistance of the driven sleeve $c$.

3. *Second speed.*—Reverse the final position of the pedals $s^1$ and $s^2$, that is by suitable operation of the pawl mechanism $s^{20}$ allow the second of the pedals to move up and press the first to the bottom. This causes the motor to drive in a similar manner but upon this occasion not through the intervention of the wheel $b^1$, but from the smaller wheel $b^2$ and causing the planet pinions $g$ to operate not upon the annulus $j$ but upon the sun wheel $f$, the circumference of which is much smaller than that of the aforesaid annulus $j$.

4. *Third speed.*—Allow the pedal $s^2$ to move completely up. This causes the motor to operate upon the planet pinions $g$ through the intervention concurrently of the sun wheel $f$ and the annulus $j$.

5. *Fourth speed.*—Press the pedal $s^2$ so that it is engaged by the pawl, and disengage the annulus clutch pedal $t$. This causes the motor only to operate through the countershaft $a^1$ and obliges the whole differential mechanism to turn as one block, thus obtaining a direct drive.

6. *Fifth speed.*—Push down the pedal $s^1$, so that it is engaged by the pawl and disengage the pawl $s^2$. This produces the same result as in the last case except that the direct drive is on this occasion effected through the smaller wheel $b^2$ instead of through the wheel $b^1$.

7. *Braking.*—Operate the pedal $x$.

8. *Reverse drive.*—All the pedals are to be brought into corresponding positions in order to obtain the fourth speed, that is to say, the pedal $s^2$ is engaged, and the pedal $s$ and the annulus clutch pedal $t$ are disengaged. Now fully depress the planet clutch pedal $v$. This causes the movable portion $i^0$ of the planet clutch $i$, $i^0$, which has up to this time been inoperative, to become operative and to exert a braking action upon the pulley $m^2$ and consequently upon the planet pinion carrier. The planet pinion carrier, under the action exerted upon it in the positive direction by the sun wheel $f$ moves the annulus $j$ and consequently, through the intervention of the annulus clutch $k$, $k^0$ and the axially movable sleeve $i^0$, to move the sleeve $c$ in the negative direction.

As has already been remarked, the invention is not limited in any way to the methods of carrying the same into effect or to the applications which have been more particularly described.

It includes, on the contrary many modifications, amongst which may be mentioned:—

The modification in which, in place of the construction just described, the respective positions of the worm wheel which controls the endless screw $e^2$ and the system of a planet and annulus clutches $i$, $i^0$ and $k$, $k^0$ would be reversed, so that the last system is located directly after the differential change speed mechanism.

A modification in which the worm wheels and worms would be replaced by gearing of other descriptions.

An arrangement in which the change speed mechanism, instead of being furnished with straight cut teeth would be provided with bevel gear wheels, in which case, supposing it is desired to profit by the advantages of having the wheels $f$ and $j$ of different diameters, the said principal wheels would be of different diameters and the planet pinions would be replaced by pairs of planet pinions each integral with a common sleeve and adjacent to one another and would be so arranged that one of the elementary pinions of said pair could mesh with one and the other with the other of the principal wheels.

In some cases I may provide a system of shafts upon the rear frame of the automobile comprising the arrangements shown in the drawing or some analogous arrangements, but for operating the shafts $a^1$ and $a^2$, in place of employing a single motor I may employ two separate motors, using in this case the "improvements relating to apparatus operated by internal combustion engines especially those for powerful automobile vehicles having to operate at times under full power and at other times under much reduced power" forming the subject matter of a patent application in my name, filed at the same time as the present application. As will be readily understood with this construction, the shaft $a$ would be omitted, as well as the pinions $b$, $b^1$ and $b^2$.

In some cases the apparatus may be employed but not be located upon a special fitting at the rear of an automobile.

In some instances, for controlling the various parts and clutches, other mechanisms may be provided besides those which have been previously described.

In general it is to be understood that the construction may be varied considerably, without departing from the principle of my invention as defined by the claims.

What I claim and desire to secure by Letters Patent of the United States of America is:—

1. In differential change speed mechanism, the combination of a sun wheel, a toothed annulus, planet pinions meshing with the said wheel and annulus, a driven shaft, means for coupling the planet pinions to the driven shaft, a principal driving shaft carrying a toothed pinion, two secondary driving shafts having toothed pinions mounted loosely thereon and meshing with the pinion on the principal shaft, plate clutches for clutching the loose pinions on the secondary shafts to the secondary shafts means for driving the sun wheel from die of the secondary shafts and the annulus from the other of such shafts, substantially as and for the purposes set forth.

2. In differential change speed mechanism, the combination of a driven shaft, a sun wheel carried by a sleeve around said shaft, a toothed annulus carried by another sleeve, planet pinions also carried by a sleeve, the said planet pinions meshing with the sun wheel and the annulus, a plate clutch for coupling the sleeve carrying the planet pinions to the driven shaft, a plate clutch for coupling the sleeve carrying the annulus to the driven shaft, a principal driving shaft carrying a toothed pinion, two secondary driving shafts having toothed pinions of different diameters mounted loosely thereon and meshing with the pinion on the principal shaft, plate clutches for clutching the loose pinions on the secondary shafts to the secondary shafts, a Cardan shaft connected to each of the said secondary shafts, a worm carried by each of the said Cardan shafts, one of the worms meshing with a worm wheel on the sleeve carrying the sun wheel and the other meshing with a worm wheel on the sleeve carrying the toothed annulus, means for braking either of the secondary shafts, for braking the planet pinion carrier and for braking the driven shaft, all substantially as and for the purposes set forth.

In witness whereof I affix my signature.

EMILE DESMOULINS.